US007446969B2

(12) United States Patent
Akagi et al.

(10) Patent No.: US 7,446,969 B2
(45) Date of Patent: Nov. 4, 2008

(54) THERMALLY ASSISTED RECORDING SYSTEM

(75) Inventors: Fumiko Akagi, Tokyo (JP); Masukazu Igarashi, Saitama (JP); Hideki Saga, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 159 days.

(21) Appl. No.: 11/134,088

(22) Filed: May 19, 2005

(65) Prior Publication Data

US 2005/0259343 A1 Nov. 24, 2005

(30) Foreign Application Priority Data

May 19, 2004 (JP) ............................. 2004-149477

(51) Int. Cl.
*G11B 5/02* (2006.01)
(52) U.S. Cl. ...................... 360/59; 360/135; 428/817; 428/829; 428/836.1
(58) Field of Classification Search .................. None
See application file for complete search history.

(56) References Cited

U.S. PATENT DOCUMENTS

| | | | | |
|---|---|---|---|---|
| 5,596,555 | A * | 1/1997 | Osato et al. | 369/13.49 |
| 5,710,746 | A * | 1/1998 | Uchiyama et al. | 369/13.41 |
| 5,780,175 | A * | 7/1998 | Chen et al. | 428/812 |
| 5,851,643 | A * | 12/1998 | Honda et al. | 428/212 |
| 6,436,524 | B1 * | 8/2002 | Ishida et al. | 428/332 |
| 6,493,164 | B1 * | 12/2002 | Kikitsu et al. | 360/59 |
| 6,528,149 | B2 * | 3/2003 | Yoshida et al. | 428/212 |
| 6,620,533 | B2 * | 9/2003 | Hikosaka et al. | 428/826 |
| 6,635,367 | B2 * | 10/2003 | Igarashi et al. | 428/828 |
| 6,636,460 | B2 * | 10/2003 | Akiyama et al. | 369/13.14 |
| 6,741,524 | B2 * | 5/2004 | Ichihara et al. | 369/13.01 |
| 6,819,586 | B1 * | 11/2004 | Anthony et al. | 365/171 |
| 6,824,817 | B2 * | 11/2004 | Araki et al. | 427/131 |
| 6,830,824 | B2 * | 12/2004 | Kikitsu et al. | 428/828.1 |
| 6,834,026 | B2 * | 12/2004 | Fullerton et al. | 369/13.1 |

(Continued)

FOREIGN PATENT DOCUMENTS

EP 0 412 222 A2 2/1991

(Continued)

OTHER PUBLICATIONS

Cumpson et al., "A Hybrid Recording Method Using Thermally Assisted Writing and Flux Sensitive Detection," IEEE 2000, HA-06.

(Continued)

*Primary Examiner*—Hoa T Nguyen
*Assistant Examiner*—Dismery Mercedes
(74) *Attorney, Agent, or Firm*—Townsend and Townsend and Crew LLP; Darren Gold

(57) ABSTRACT

A thermally assisted magnetic recording system is provided to achieve excellent thermal resistance and low noise. In one embodiment, a magnetic recording medium is used, in which the magnetic intergrain exchange coupling is large to let the magnetization be thermally stable by coupling the magnetic grains constituting the recording layer at room temperature (the temperature maintaining the magnetization) and reduced by heating during recording to let the recording magnetization transition slope become steep. Parameter A normalizing the slope around the coercivity of the MH-loop of the medium is $1.5 \leq A < 6.0$ at room temperature, and it becomes approximately 1.0 with heating.

19 Claims, 13 Drawing Sheets

U.S. PATENT DOCUMENTS

| | | | |
|---|---|---|---|
| 6,881,495 B2 * | 4/2005 | Kikitsu et al. | 428/827 |
| 6,894,857 B2 * | 5/2005 | Kikitsu et al. | 360/59 |
| 6,950,260 B2 * | 9/2005 | Coffey et al. | 360/59 |
| 7,038,873 B2 * | 5/2006 | Shimazaki et al. | 360/59 |
| 2001/0051287 A1 * | 12/2001 | Kikitsu et al. | 428/694 ML |
| 2002/0064689 A1 * | 5/2002 | Yamanaka et al. | 428/694 TM |
| 2004/0191576 A1 * | 9/2004 | Shimizu et al. | 428/694 TM |

FOREIGN PATENT DOCUMENTS

| | | |
|---|---|---|
| EP | 1 653 451 A1 | 5/2006 |
| JP | 10-079307 | 3/1998 |
| JP | 2001-344725 | 12/2001 |
| JP | 2002-358616 | 12/2002 |

OTHER PUBLICATIONS

Matsumoto et al., "Magnetic Recording Properties of Magneto-Optical Media by Merge Type GMR Head," IEEE 2000, HA-04.

Kubota et al., "Intergrain magnetic coupling and microstructure in CoPtCr, CoPtCrTa, and CoPtCrB alloys," *Journal of Applied Physics*, vol. 84, Issue 11, Dec. 1, 1998, pp. 6202-6207.

Christner et al., "Low-noise metal medium for high-density longitudinal recording," *Journal of Applied Physics*, vol. 63, Issue 8, Apr. 15, 1988, pp. 3260-3262.

* cited by examiner (a)

(b)

(a)

(b)

THERMALLY ASSISTED RECORDING SYSTEM

CROSS-REFERENCES TO RELATED APPLICATIONS

This application claims priority from Japanese Patent Application No. JP2004-149477, filed May 19, 2004, the entire disclosure of which is incorporated herein by reference.

BACKGROUND OF THE INVENTION

The present invention relates to an information recording system with a high recording density and a thermally assisted recording system, in which a magnetic recording medium and a magnetic read/write head comprising a mechanism for heating the recording medium are provided.

As one of the information recording systems, a magnetic disk mounted in a computer or the like requires high recording density to support modern information overloaded society. In order to realize the high recording density of a magnetic disk system, it is desirable to narrow the distance between the magnetic disk and the magnetic head, to make the grain size consisting of the magnetic layer of the magnetic recording medium smaller, to increase the coercivity (anisotropy field) of the magnetic recording medium, and to enhance the speed of the signal processing technique.

In a magnetic recording medium, reducing the grain size leads to decreased noise but, on the other hand, a problem arises that the particles become thermally unstable. Therefore, the anisotropy energy should be made larger in order to be thermally stable with reducing the grain size. However, because of the limitation of the magnetic pole material used for the write head and the limitation of narrowing the distance between the magnetic disk and the magnetic head, it is difficult to increase the anisotropy field in proportion to achieve a high recording density in the future.

In order to solve the above-mentioned problems, a hybrid recording technique combining an optical recording technique with a magnetic recording technique has been proposed and is receiving attention. For example, in Intermag 2000 HA-04 and HA-06, the read/write head used is one on which a mechanism is added for heating the medium. While recording, the coercivity of the medium is reduced by heating the medium with applying magnetic fields. Because of this, it becomes easy to write on a medium with high coercivity, in which there was difficulty in recording using a conventional magnetic head due to insufficient magnetic field intensity. An MR (magneto-resistive) head is used for reproducing, which is a component of conventional magnetic recording system. The recording method described above is called thermally assisted magnetic recording.

Moreover, JP-A No. 344725/2001 discloses a perpendicular magnetic recording medium, in which a second recording medium having a perpendicular magnetic anisotropy and a greater intergrain magnetic exchange coupling is sputter-deposited on a first recording layer having the perpendicular magnetic anisotropy and a magnitude of the intergrain magnetic exchange coupling of almost zero. In JP-A No. 358616/2002, a magnetic recording medium is disclosed, in which a base layer including a magnetic layer, a switching layer including a non-ferromagnetic layer, and a recording layer containing ferromagnetic grains and non-ferromagnetic grain boundaries are formed in order on a substrate. A magnetic recording medium is disclosed in which the thickness of the switching layer and the distance between the magnetic grains constituting the recording layer are limited to satisfy the condition of TcB>Tsw, where the Curie point of the base layer is TcB and the temperature initiating the magnetic exchange coupling between the recording layer and the base layer is Tsw. In JP-A No. 79307/1998, a recording medium is disclosed, in which the Cr content is in the range of 21-24 at % at the grain boundaries of the microcrystalline grains constituting the magnetic thin film which becomes the magnetic recording medium.

BRIEF SUMMARY OF THE INVENTION

For thermally assisted magnetic recording it is important to develop not only a technique to merge a magnetic head and a heating mechanism for the medium, but also a medium suited for thermally assisted magnetic recording. Although the CoCr alloy medium used for a conventional magnetic disk system is easy to fabricate, it is necessary to make the grain size smaller than the current (9 nm) to achieve the super-high recording density of terabit class memory capacity. For instance, in the case when the magnetization transition length is about 15 nm, it is expected that the grain size should be made as small as 3 nm. On the other hand, in order to avoid degradation of recording magnetization by thermal activation, it is known that the value $K_u \cdot V/k \cdot T$, in which the product of V, the volume of grains, and magnetic anisotropy energy, $K_u$, divided by the product of Boltzmann's constant, k, and temperature, T, is preferably 100 or more. Therefore, even if the maximum anisotropy energy of $5 \times 10^5$ J/m$^3$ (anisotropy field of 1600 kA/m) for a CoCr alloy and a general film thickness of 20 nm are used, it is impossible to make the grain size less than 7 nm. Therefore, it is considered impossible to achieve a super-high recording density for a conventional magnetic recording technique using a CoCr alloy medium.

It is thought that strengthening the intergrain magnetic exchange coupling and increasing the magnetization switching unit of the grains are effective to improve the thermal stability. However, if a medium, which has a large magnetization switching unit of grains, is written by a conventional recording technique, the magnetic transition region becomes disordered, resulting in increased noise. For instance, in JP-A No. 79307/1998, a magnetic recording medium is disclosed as a medium with strengthened intergrain magnetic exchange coupling, in which the Cr content of the micro-grain boundaries in the magnetic thin film is controlled to be in the range of 21-24 at %. Because this is the purpose for reducing noise, the increase of the intergrain magnetic exchange coupling is too weak to increase the magnetization switching unit of the grains, so that it is understood that the thermal stability cannot be improved.

On the other hand, a medium material used mainly for the primary experiments of thermally assisted magnetic recording is TbFeCo which is used for magneto-optical recording systems. TbFeCo exhibits strong perpendicular magnetic anisotropy, has less noise caused by grain boundaries and, moreover, the composition of it can be continuously controlled. From this viewpoint, this material is superior to the CoCr alloy system conventionally used for magnetic recording media. However, because TbFeCo has strong intergrain magnetic exchange coupling, the parameter A mentioned later is very large and the recording magnetization spreads larger than an optical spot, therefore, it is thought that there is limitation to increasing the recording density. Moreover, the magnetization becomes smaller because TbFeCo has a magnetic compensation temperature at room temperature. Therefore, a scheme is necessary for a reproducing technique, such as heat irradiation during reproduction, etc.

For instance, as the medium to increase the thermal stability described in JP-A No. 344725/2001 and as a thermally assisted magnetic recording medium described in JP-A No. 358616/2002, there are media in which, for instance, CoCr alloy and TbFeCo layers are deposited by a sputtering method. This is a medium designed for the purpose of increasing the grain volume by coupling the CoCr alloy layer and TbFeCo layer using the magnetic exchange coupling and unifying them as a recording layer. Therefore, the TbFeCo layer thickness has to be increased while reducing the magnetic grain size, so that the film thickness may become greater than 10 nm for a high recording density. However, because the distance between the head and soft magnetic layer increases with increasing TbFeCo layer thickness, the magnetic head field intensity applied on the medium decreases and the distribution of the magnetic head field applied on the medium becomes broad. As a result of that, the read/write characteristics are deteriorated.

As mentioned above, searching for a medium material and structure to use thermally assisted magnetic recording effectively becomes an important issue.

It is a feature of the present invention to provide a thermally assisted magnetic recording system comprising a medium suited for the thermally assisted magnetic recording method.

According to one aspect of the invention, a thermally assisted magnetic recording system uses a magnetic recording medium, in which magnetic exchange coupling between the magnetic grains in the recording medium is large at room temperature (the temperature to maintain the magnetization) to make the magnetization thermally stable by coupling the magnetic grains and decreases by heating to make the magnetization transition slope become steep while recording.

In specific embodiments, the thermally assisted magnetic recording system uses a magnetic recording medium having an amorphous TbFeCo layer, CoCr layer, a lamination layer of CoCr and Pt, or a lamination layer of CoCr and Pd on the substrate side of the recording layer. The film thickness of the aforementioned layers deposited on the substrate side of the recording layer is controlled to be 5 nm or less.

Both aforementioned magnetic recording media used for the thermally assisted magnetic recording media of the present invention have the parameter A satisfying the range of $1.5 \leq A < 6.0$ at room temperature (the temperature T maintaining the magnetization: $-30°$ C. $< T < 80°$ C.), in which the parameter A is a normalized value of the slope parameter around the coercivity of an MH loop, but the parameter A of the MH loop becomes small, about 1, by increasing the temperature of the medium by heating. Here, parameter A has a value defined by the following expression.

[Expression 1]

$$\left(A \equiv \frac{1}{\mu_0} \frac{\partial M}{\partial H}\bigg|_{M=0} ; \text{absolute permeability of vacuum}\right)$$

Embodiments of the present invention provide a thermally assisted magnetic recording system achieving excellent thermal stability and lower noise by using a medium having the characteristic in which the magnetic exchange coupling is very strong at room temperature and decreases by heating.

DETAILED DESCRIPTION OF THE INVENTION

Figure 2:
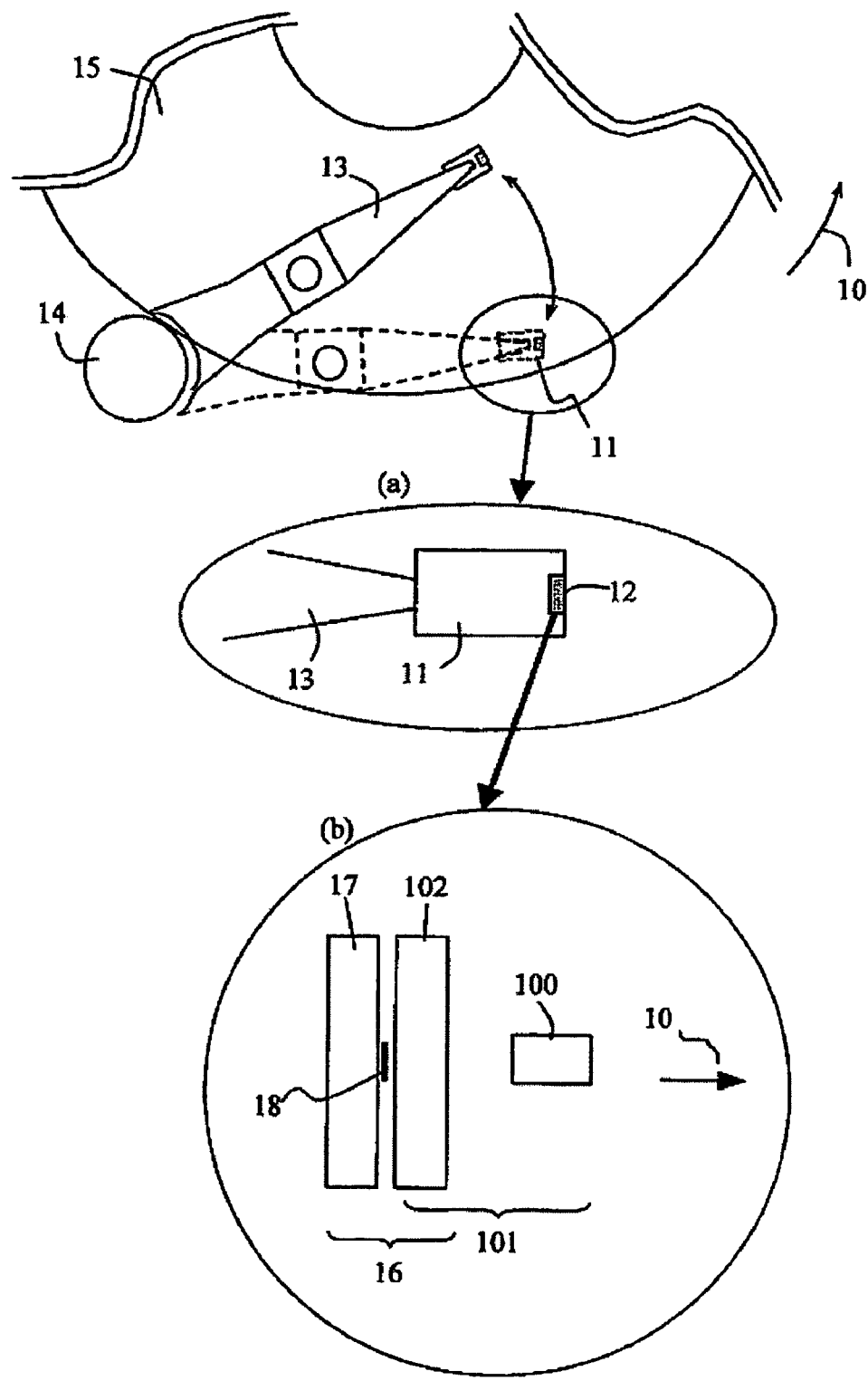
FIG. 2 is a schematic drawing of a structure of a magnetic disk system according to an embodiment of the present invention.

Hereafter, specific embodiments of the present invention will be described with reference to the accompanying drawing as follows. FIG. 2 is a schematic drawing of a structure of a magnetic disk system according to an embodiment of the present invention. Usually, one or more magnetic disks 15 are mounted in the drive of the magnetic disk system. The magnetic disk 15 of the present embodiment is a magnetic disk for perpendicular magnetic recording comprising a soft magnetic under layer and a perpendicular magnetic recording layer, and it is rotation-driven in the direction of arrow 10.

As shown in the enlarged drawing (a), the magnetic head 12 at the rear end of the magnetic head slider 11 fixed to the point of carriage 13 accesses an arbitrary track by the voice coil motor 14 and reads/writes the information on the magnetic disks (media). The enlarged drawing (b) is a schematic drawing of the magnetic head 12 viewing the configuration of the recording write head 101 and the reproducing read head 16 from the side opposite the medium. The write head 101 is a single pole type write head for perpendicular magnetic recording comprising the main pole 100 and the auxiliary pole 102, and magnetic recording to the medium 15 is carried out by the leakage magnetic field from the main pole 100. The read head 16 comprises the read sensor 18 consisting of a magneto-resistive effect sensor located between the magnetic shield 17 and the magnetic shield 102, which also serves as the auxiliary pole, and the reproducing output is obtained by flowing the leakage magnetic field from the medium 15 into the read sensor 18.

Figure 3:
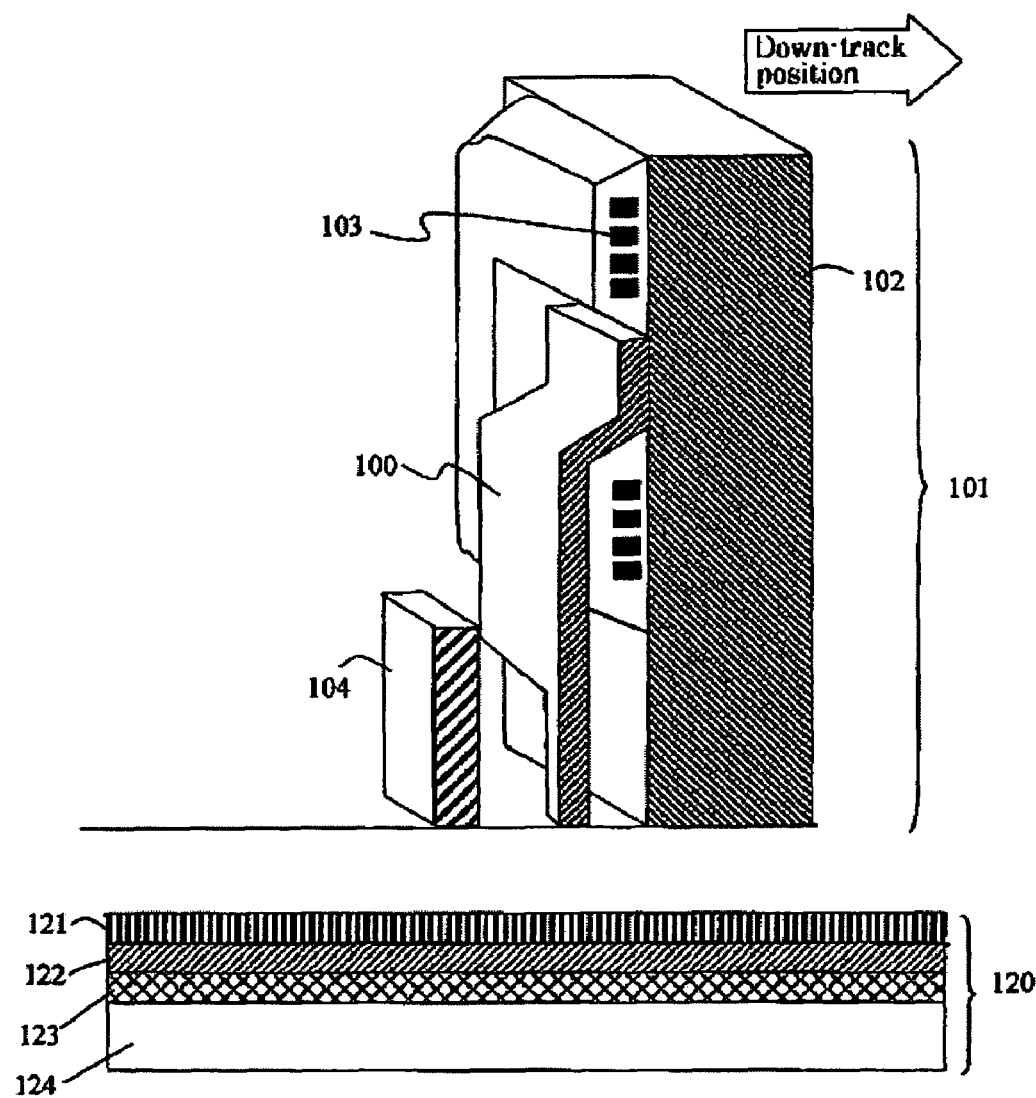
FIG. 3 is a configuration example illustrating a write head of the present invention.

FIG. 3 is a configuration example illustrating a write head/medium system including a heating mechanism according to the present embodiment. FIG. 3 illustrates the cross-sectional structure around the write head cutting the write head 101 and magnetic recoding medium 120 at a face perpendicular to the recording medium (vertical direction in FIG. 3) and parallel to the down-track direction.

The write head 101 has the main pole 100 and the auxiliary pole 102 and the plate-shaped auxiliary pole 102 is formed almost perpendicular to the recording medium 120. Moreover, the conductor pattern 103 is formed in a spiral on the auxiliary pole 102, and both ends are drawn out and connected to the magnetic head drive circuit. One end of the main pole 100 is connected to the auxiliary pole 102, and the other end reaches the bottom surface of the write head facing the magnetic recording medium 120. The auxiliary pole 102, main pole 100, and the conductor pattern 103 collectively constitute an electromagnet, and with the driving current a recording magnetic field is applied to the magnetic recording layer 121 located around the tip of the main pole 100.

As the heating mechanism, for instance, the resistance heater 104 is placed with respect to the main pole as shown in the FIG. 3, at a position separated from the main pole on the side opposite the down-track direction. Alternatively, it is placed with respect to the main pole on the down-track direction side. The resistance heater 104 can heat a wide area of the medium around the resistance heater; therefore, it can heat the desired position even if it is placed separated from the main pole. The power supply lines (which are not illustrated in FIG. 3) are connected to the resistance heater 104 to flow current and are drawn out from the write head 102. Current flows to the resistance heater 104 and the recording medium is heated by radiant heat.

Figure 4:
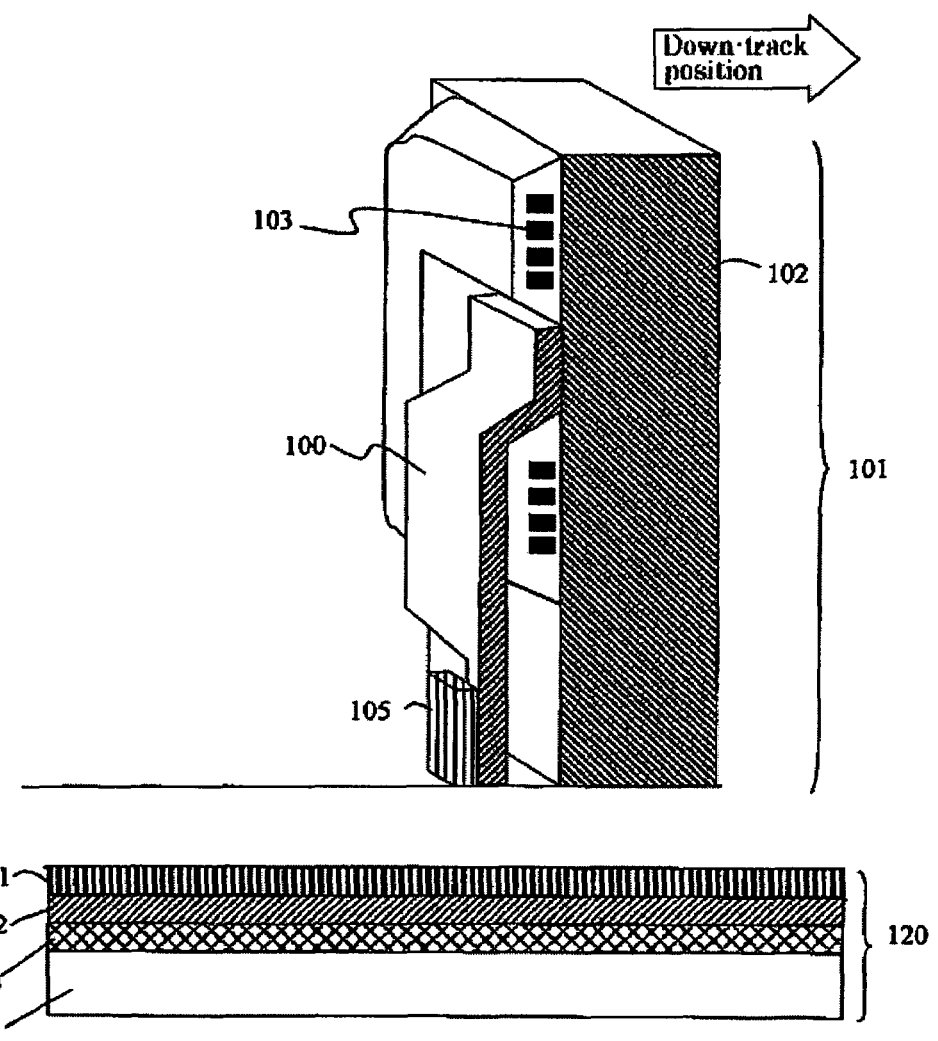
FIG. 4 is another configuration example of a write head of the present invention.

FIG. 4 is another configuration example of a heating mechanism and write head/medium system. The write head and medium are the same as in FIG. 3. The resistance heater 105, which is a heating mechanism, is placed adjacent to the main pole 100. Thereby, the heater 105 can sufficiently heat the portion right below the main pole 100, which especially needs heating.

Moreover, other heating mechanisms may be used, in which a laser beam focused by a lens irradiates the medium, and further, a laser beam, being focused by a lens, irradiates a metal dispersion and heats it up.

Furthermore, as the other heating mechanism, a technique of heating may be used, in which a voltage is applied between the main pole and the medium to flow a current.

The recording medium 120 is formed by sputtering on the crystallized glass substrate 124, in order, a soft magnetic under layer 123, a nonmagnetic intermediate layer 122, and a CoCr alloy magnetic recording layer 121. Herein, the substrate temperature while sputtering the CoCr alloy magnetic recording layer is controlled to be from about 50° C. to 150° C. The nonmagnetic intermediate layer 122 is, for instance, Ru, Rh, or Ir and is provided to control the crystalline magnetic anisotropy of the magnetic recording layer 121. A layer of NiAl or NiTa may be provided to control the grain size of the recording layer before depositing the nonmagnetic intermediate layer 122. The soft magnetic under layer 123 serves to make the recording magnetic field stronger and steeper by magnetically coupling with the write head. For instance, CoCrPt, CoCrPtTa, and CoCrPtB, etc. may be used for the CoCr alloy magnetic recording layer 121. The film thickness of the recording layer 121 is preferably 20 nm or less to let the write head and the soft magnetic under layer 123 magnetically couple with each other.

Figure 5:
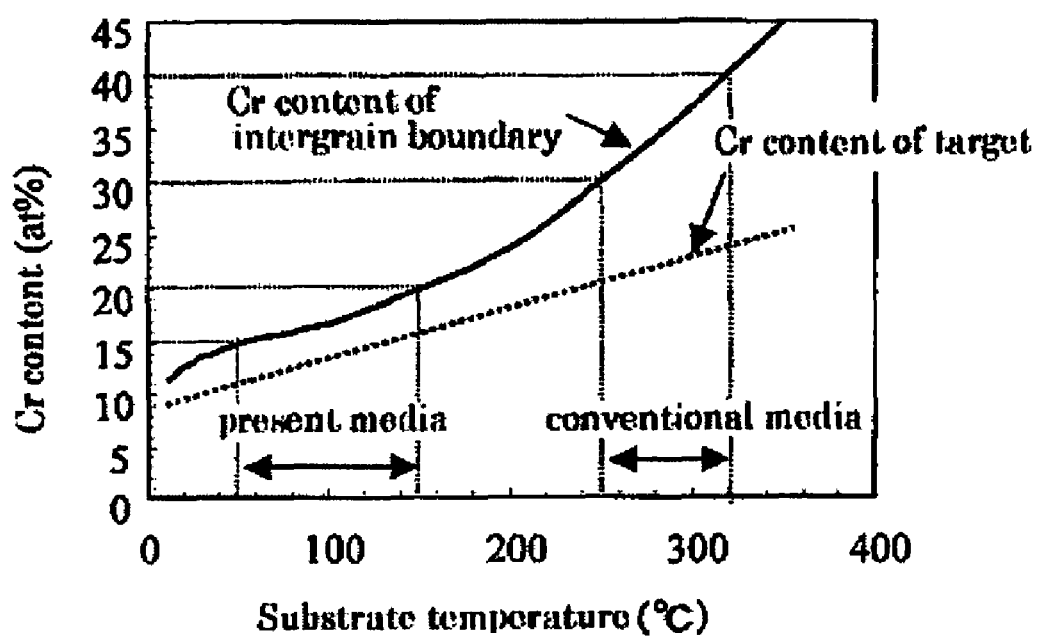
FIG. 5 shows the relationships between the substrate temperature while fabricating the recording layer, Cr content of a target, and Cr content of intergrain boundaries of a fabricated recording layer.

FIG. 5 shows the relationships between the substrate temperature, Cr content of a target, and Cr content of intergrain boundaries of a fabricated recording layer. The medium is fabricated on the glass substrate by depositing 100 nm thick permalloy as the soft magnetic under layer, 20 nm thick Ru as the nonmagnetic intermediate layer, and then depositing a 20 nm thick CoCrPt recording layer after changing the substrate temperature from 10° C. to 350° C. It is observed that the fabricated medium is a perpendicular magnetic layer having the easy axis perpendicular to the film surface according to X-ray diffraction analyses etc. Additionally, TEM analyses confirmed that the grains are columnar. Next, using a transmission electron microscope with a high resolution Energy Dispersive X-ray Spectroscopy (EDX), the Cr content of the grain boundaries was measured to investigate the microscopic composition distribution in the magnetic recording layer. The Cr-content is detected by using the EDX with a spatial resolution of 1 nm, irradiating the electron beam to the grain boundaries. It is understood from FIG. 5 that the Cr-content of grain boundaries increases proportionally with increasing substrate temperature.

Figure 6:
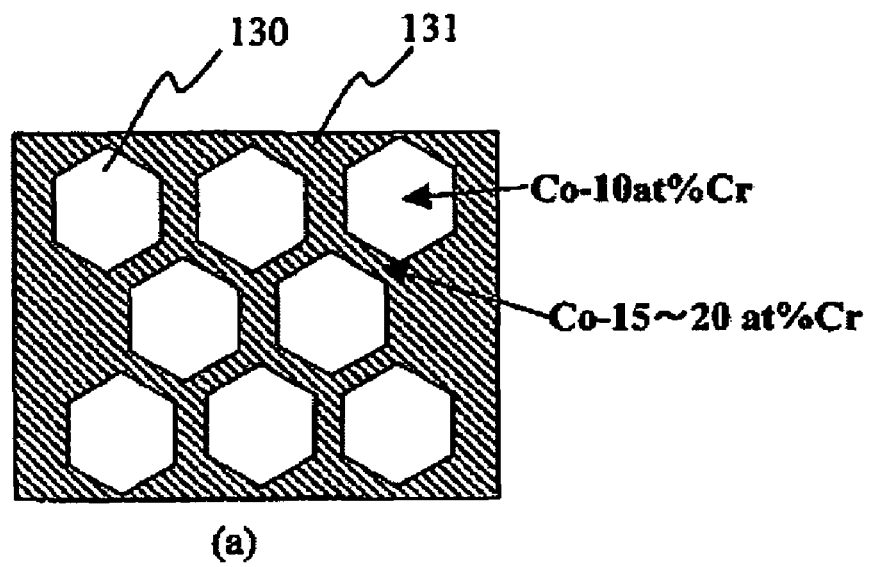
FIG. 6 is a pictorial view illustrating the magnetic grains and the grain boundaries.
Figure 6:
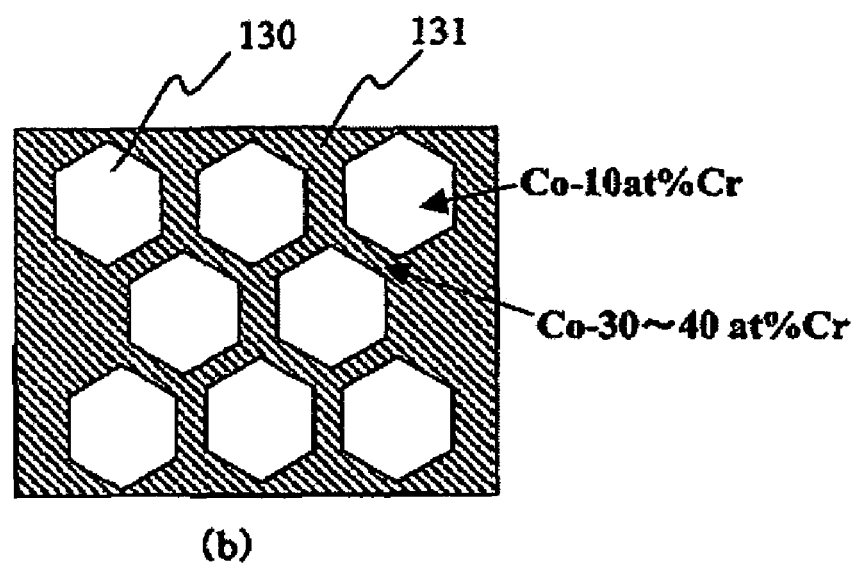

FIG. 6 is a pictorial views illustrating the magnetic grains 130 and the grain boundaries 131 and shows the comparison of Cr content between the present embodiment A and conventional media B. In the case of the present embodiment (FIG. 6A) in which the substrate temperature is controlled to be about 50° C. or more and about 150° C. or less, the Cr content of the grain boundaries becomes about 15-20 at %. This Cr content is far lower than that of grain boundaries in conventional perpendicular media shown in FIG. 6B which are fabricated at substrate temperatures of 250° C. or more. That is, conventional perpendicular magnetic recording media are fabricated with the goal of making the magnetic exchange energy zero between the magnetic grains 130 by increasing the Cr content of the grain boundaries 131. On the other hand, the perpendicular magnetic recording media of the present embodiment are fabricated with the goal of making the magnetic exchange coupling stronger by increasing the magnetic exchange energy between the magnetic grains.

Figure 7:
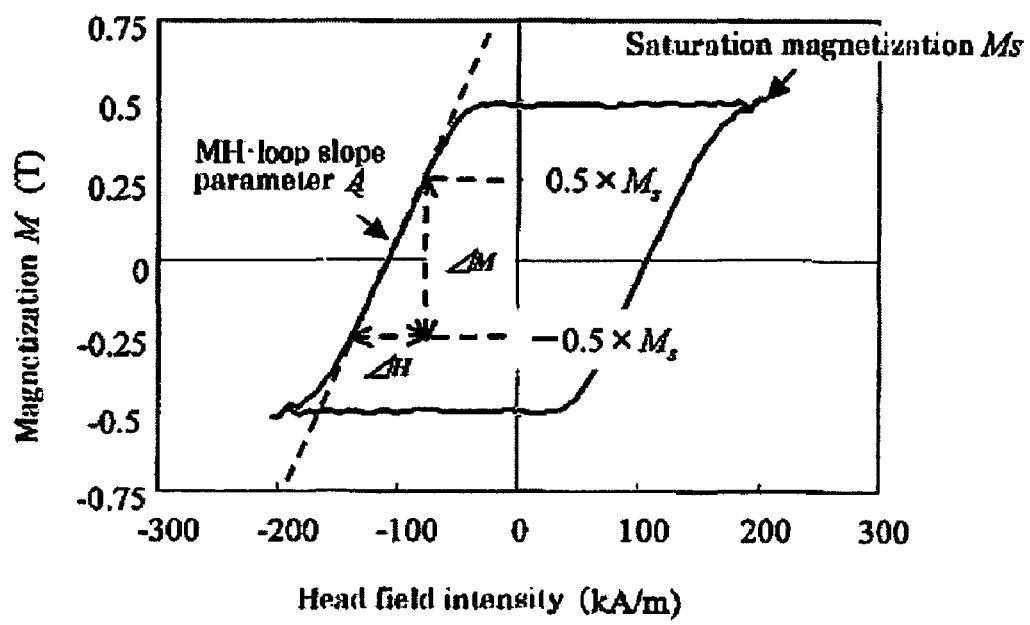
FIG. 7 is an example showing an MH loop of a magnetic recording medium.

FIG. 7 is an example showing a magnetization M-magnetic field H curve (MH-loop) of a medium at room temperature fabricated as mentioned above. A method for detecting the A.C. field generated by vibrating the measurement sample (VSM measurement) and an optical method (Kerr effect) using the phenomena of tilting the polarization angle of reflected light corresponding to the magnetization may be used as magnetization measurement techniques. The parameter A of the present embodiment is about 2. If the intergrain exchange energy is zero, the parameter A is almost 1, and the parameter A becomes greater with increasing the magnetic exchange coupling. Therein, as shown in FIG. 7, when the slope parameter of the line crossing the values of ±50% of the saturated magnetization $M_s$ is $\Delta M/\Delta H$ and the absolute permeability of vacuum $(4\pi \times 10^{-7}[H/m])$ is $\mu_0$, the parameter A is obtained using the following expression.

$$A = (\Delta M/\mu_0)/\Delta H$$

Figure 8:
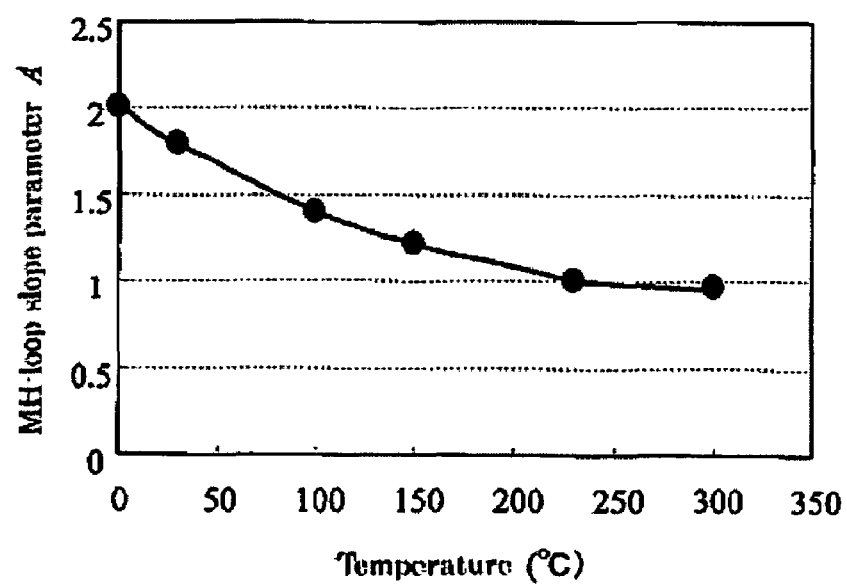
FIG. 8 shows the relationship between the MH-loop slope parameter A and the temperature in the first embodiment of the present invention.

Next, the MH-loop was measured with heating the medium. The heating temperature was changed from 0° C. to about 300° C. FIG. 8 shows the relationship between the parameters A and the heating temperatures. FIG. 8 indicates that the parameter A decreases with increasing the temperature. That is, it is understood that the magnetic exchange coupling between magnetic grains decreases and reaches almost 0 at 230° C. or greater.

Therefore, using a thermally assisted magnetic recording system according to the present embodiment, recorded magnetizations are thermally stable at room temperature because of the strong intergrain magnetic exchange coupling, and the magnetization transition slope is steep because the intergrain magnetic exchange coupling becomes smaller by heating-up the magnetic recording layer 121 with applying the magnetic head field using the main pole 100.

The information recorded on the magnetic recording layer 121 is reproduced magnetically by detecting the leakage flux from the magnetic recording layer using a read head with a mounted flux detecting device such as a GMR (Giant magnetoresistive effect) sensor or a TMR (Tunnel magnetoresistive effect) sensor, etc. Or, it may be optically reproduced by a read head with a mounted optical flux detecting device using the Kerr effect and Faraday effect on the recording medium.

The effect of the present embodiment is shown as follows by the computer simulation using micro-magnetics, which is the Langevin equation where the effective magnetic field h (t) according to the thermal energy is added to the following Landau-Lifshitz-Gilbert equations (J. Appl. Phys. 75(2), 15 Jan. 1994).

[Expression 2]

$$\frac{dM}{dt} = -\gamma[M \times (H_{eff} + h(t))] + \frac{\alpha}{M}\left[M \times \frac{dM}{dt}\right] \quad (1)$$

$$<h_i(t)h_j(t+\tau)> = \frac{2kT\alpha}{\gamma V M_s}\delta(\tau)\delta_{ij} \quad (2)$$

$$<h_i(t)> = 0 \quad (3)$$

Here, M is the magnetization of grains, $H_{eff}$ is the effective field, $\gamma$ is the gyromagnetic ratio $\alpha$ is the damping constant (decay constant) of Gilbert, $M_s$ is the saturation magnetization, T (t) is a effective magnetic field by thermal activation, k is Boltzmann's constant, T is the temperature, V is the volume of grains, $\delta(\tau)$ is the delta function of Dirac, $\tau$ is the time step. $\delta_{ij}$ is the Kronecker delta and i and j are the components (x, y, z) of the magnetic field. < > means the time mean.

According to expressions 2 and 3, the magnitude of h (t) applied to each grain follows the Gaussian distribution for which the average is 0 and the coefficient of the right-side of the expression (2) ($2kT\alpha/\gamma V M_s$) is the variance, and the direction is a random vector. Moreover, $\delta(\tau)$ is the inverse number of the time step, and the magnitude of the effective magnetic field changes in each time step. The main pole of the recording head has a magnetic pole thickness of 400 nm in the down-track direction and a magnetic pole width of 100 nm in the cross-track direction. The spacing between the main pole and the medium is controlled to be 15 nm. The heating mechanism employs is a method in which a resistance heater is adjacent to the main pole and heats right below the main pole.

The magnetic head field was analyzed by the commercial program MAGIC for calculating three-dimensional magnetic fields using the integral element method. The magnetic head field is 960 kA/m or less. The thermal profile was calculated by the heat conduction equation using the finite element method. The thermal energy was assumed to be absorbed uniformly along the film thickness direction. Heating by incidence power of 1 mW for 4 ns made the heating temperature, T, 200° C. The output signal is obtained by substituting the sensitivity function of the MR head for the reciprocity theorem expression (Mitsunori Matsumoto: Magnetic recording (Kyoritsu Publishers, Tokyo, 1977)). The output conditions are the distance between the shields $G_s$=0.06 μm and the write track pitch $T_{WT}$=80 nm.

Figure 9:
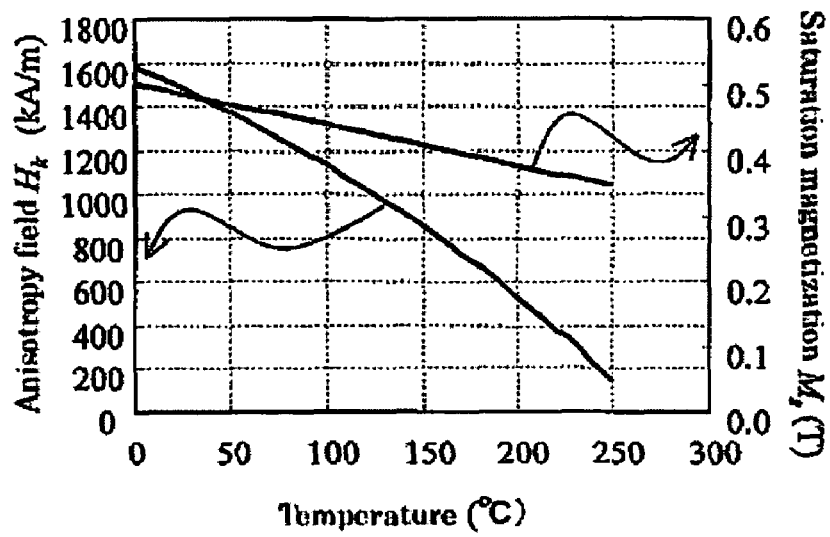
FIG. 9 shows the temperature dependences of the anisotropy field Hk and the saturation magnetization Ms.

FIG. 9 shows the temperature dependence anisotropy field $H_k$ and the saturation magnetization $M_s$. It is known that the anisotropy field decreases 15% and the saturation magnetization decreases 5% when the temperature increases 40° C. (IEEE Trans. Magn., vol. 34, pp. 1558-1560, 1998). FIG. 9 indicates that when the heating temperature T=200° C. (room temperature is 20° C.) using the above-mentioned heating means, the anisotropy field $H_k$ is reduced to about 400 kA/m.

Figure 1:
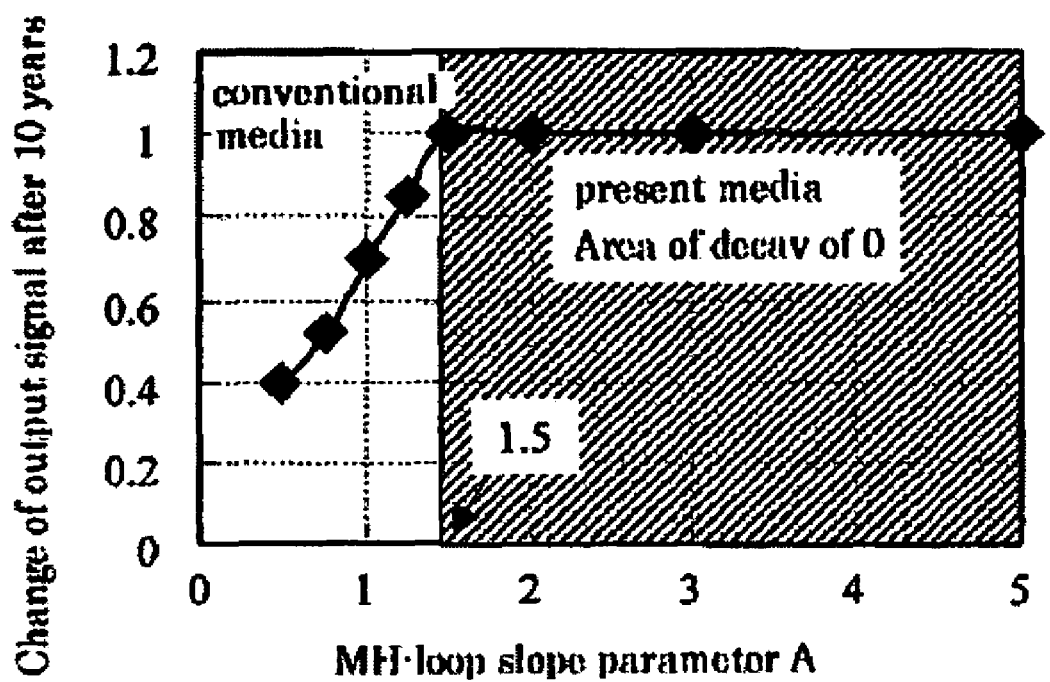
FIG. 1 shows the relationship between the change in output signal after 10 years and the parameter A in the first embodiment of the present invention.

FIG. 1 shows the relationship between the change of output signal in 10 years after recording and the parameter A, where a grain size of a medium=3 nm, the thickness of a recording layer=20 nm (the ratio of grain size Dgrain and film thickness t, Dgrain/t is about 0.15), and the medium is heated up to 200° C. by the above mentioned heating mechanism. The recording magnetization pattern, with a magnetization transition length of 50 nm, is recorded alternately upward and downward along the medium thickness direction (hereafter, the magnetization transition length is called the bit length). Thus, it is clear that the residual ratio of output signal increases with increasing parameter A, and signal does not decay when the parameter A is about 1.5 or more. That is, it is understood that a medium with the parameter A greater than about 1.5 improves the thermal stability. Although a similar calculation was done changing Dgrain/t from 0.15 to 1.0, similar to FIG. 1 signal did not decay when the parameter A was about 1.5 or more. Here, the reason why Dgrain/t was changed in the region from 0.15 to 1.0 is as follows. With decreasing ratio of Dgrain and t, the magnetization rotates unevenly and becomes thermally unstable; therefore, Dgrain/t is preferably 0.15 or more (IEEE Trans. Magn. Vol. 39, No. 5, September 2003). Moreover, according to the mechanism of perpendicular magnetic recording, a recording layer thickness greater than the grain size gives a steep magnetization transition slope and it is thermally stable, therefore, Dgrain/t is preferably 1.0 or less.

Figure 10:
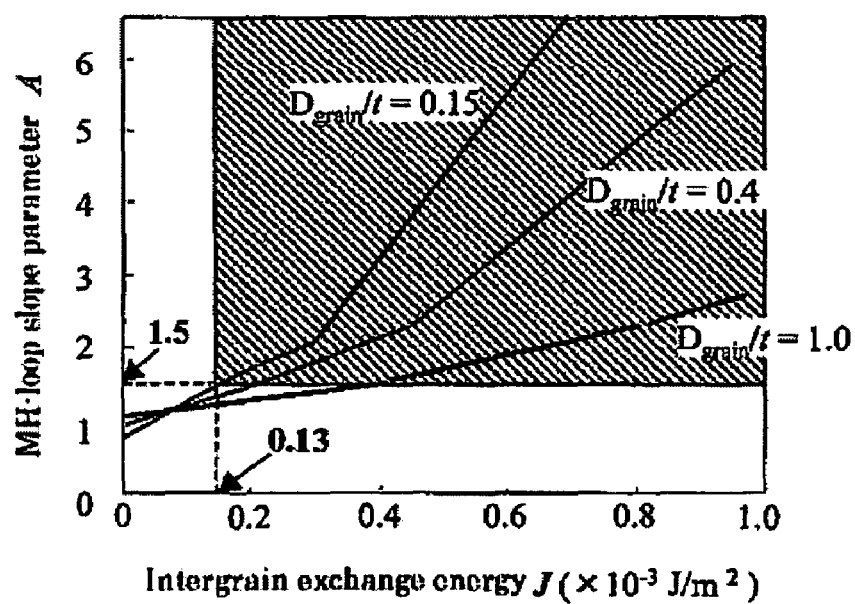
FIG. 10 shows the relationship between the magnetic intergrain surface exchange energy and parameter A.

The following is the reason why the signal does not decay if the parameter A is about 1.5 or more. FIG. 10 shows the relationship between the surface exchange energy J (j/m²) and the parameter A when the ratio of the grain size Dgrain and the film thickness t, Dgrain/t, is 0.15, 0.4, and 1.0. Thus, it is understood that J becomes at least $0.13 \times 10^{-3}$ J/m² so that the parameter A is about 1.5 or more when Dgrain/t is 0.15 or more. That is, considering that the conventional CoCr alloy medium has a J of almost zero, it is understood that a relatively strong magnetic exchange coupling, which is $0.13 \times 10^{-3}$ J/m² or more, works between the magnetic grains in the medium of the present embodiment. The magnetization switching unit becomes larger with increasing strength of the magnetic exchange coupling between the magnetic grains; therefore, it is thought that signal does not decay when the parameter A is about 1.5 or more.

As shown in the above-mentioned results, the stronger the magnetic exchange coupling between magnetic grains, the more the thermal stability is improved. In conventional magnetic recording system, it is known that the stronger magnetic exchange coupling between the magnetic grains, the greater the noise. However, if write process is carried out at a temperature enough to reduce the magnetic exchange coupling of the medium using the present invention, it would be possible to obtain a steep magnetization transition slope and reduce the noise.

Figure 11:
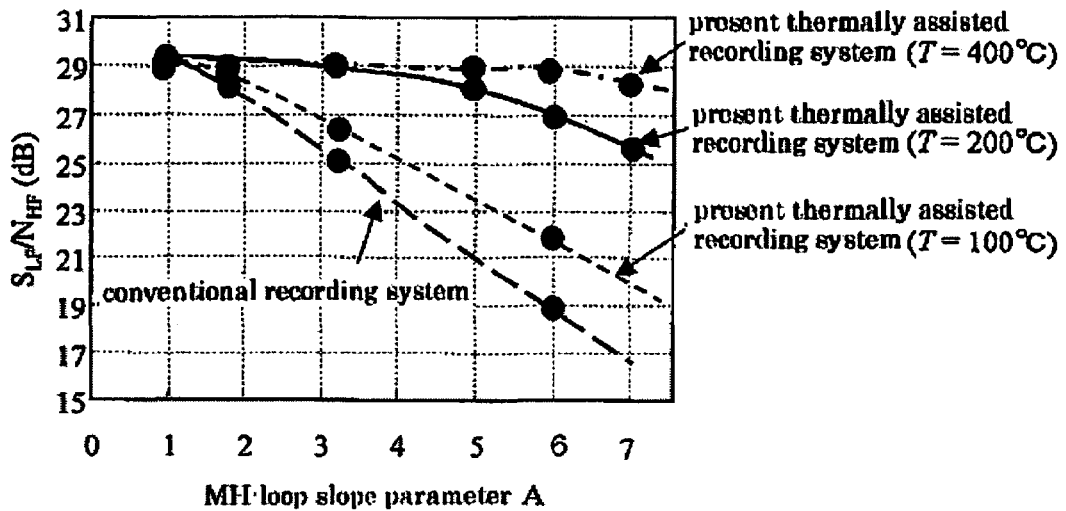
FIG. 11 shows the relationship between the MH-loop slope parameter A and SLF/NHF in the first embodiment of the present invention.

FIG. 11 shows the calculation results of the parameter A dependence of the ratio of the output signal $S_{LF}$ with a bit length of 150 nm and the noise $N_{HF}$ with a bit length of 25 nm, comparing between a conventional magnetic recording system and the present thermally assisted magnetic recording system with changing heating temperatures T. The value of Dgrain/t is 0.15. The grain size and $H_k$ of the medium are the same as for FIG. 1. Thus, it is understood that $S_{LF}/N_{HF}$ decreases with increasing the parameter A in a conventional magnetic recording system. On the other hand, in the present embodiment, $S_{LF}/N_{HF}$ increases with increasing the heating temperature at the same parameter A and, when a heating temperature is 400° C. and A is about 6 or less, $S_{LF}/N_{HF}$ has a constant value. The reason is that the magnetic exchange coupling between the magnetic grains becomes almost 0 by heating while recording. It is confirmed that even when Dgrain/t is 0.4, and 1.0, $S_{LF}/N_{HF}$ has a constant value up to A of about 6.

As shown in FIG. 9, the medium of the present embodiment has characteristics in which the magnetic exchange coupling decreases linearly with increasing temperature. However, it is preferable to select a medium material in which the magnetic exchange coupling rapidly decreases with increasing temperature, because it can prevent the magnetization of grains from switching in the cooling process because of the magnetic exchange coupling.

Figure 12:
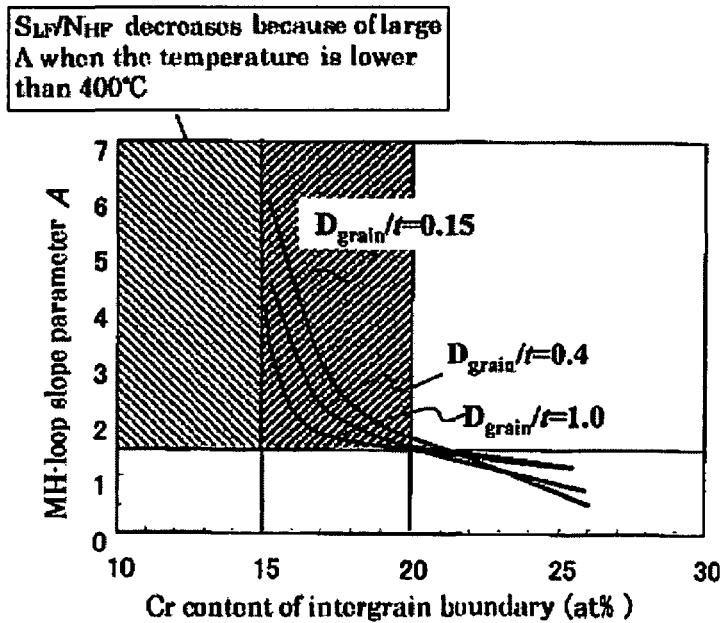
FIG. 12 shows the relationship between the MH-loop slope parameter A and the Cr-content of magnetic grain boundaries of the recording layer in the first embodiment of the present invention.

FIG. 12 shows the relationship between the Cr content of the grain boundaries and the parameter A in the case when Dgrain/t is 0.15, 0.4, and 1.0. It is understood that the Cr content should be 20 at % or less to make the parameter A 1.5 or more. Moreover, considering the limitation of the heating temperature of the heater, heating above 400° C. becomes impossible. FIG. 11 indicates that the parameter A should be less than about 6.0 so as not to deteriorate the $S_{LF}/N_{HF}$ at T=400° C. or less. It is understood from FIG. 12 that the Cr content is required to be 15 at % or more when Dgrain/t is 0.15. Moreover, when Dgrain/t is 0.4 and 1.0, the parameter A rapidly increases to about 6.0 at a Cr content around 15 at %. Thus, it is understood that the Cr content is required to be 15 at % or more to make the parameter A about 6.0 or less even if Dgrain/t is 0.4 and 1.0. Therefore, it is understood that the Cr content of intergrain boundaries may be about 15 at % or more and about 20 at % or less.

The following are actual experimental results. Two kinds of medium were prepared. After a 100 nm thick permalloy soft magnetic under layer and a 20 nm thick Ru nonmagnetic intermediate layer are sputter-deposited on a substrate, the medium of the present embodiment is fabricated by sputter-depositing a 20 nm thick CoCrPt recording layer using a target with a Cr-content of 20 at % and a substrate temperature of 150° C.; on the other hand, a conventional medium is fabricated by sputter-depositing a 20 nm thick CoCrPt recording layer using a target with a Cr content of 15 at % and a substrate temperature of 280° C. Argon (Ar) gas pressure was controlled to be 0.9 Pa when forming each layer. When the parameters A of the two kinds of fabricated media were obtained from the MH-loops using the magneto-optic Kerr effect, parameters A were 2.0 and 1.0, respectively. Next, the intergrain exchange coupling energies of these media were obtained as follows using activation volumes.

Figure 13:
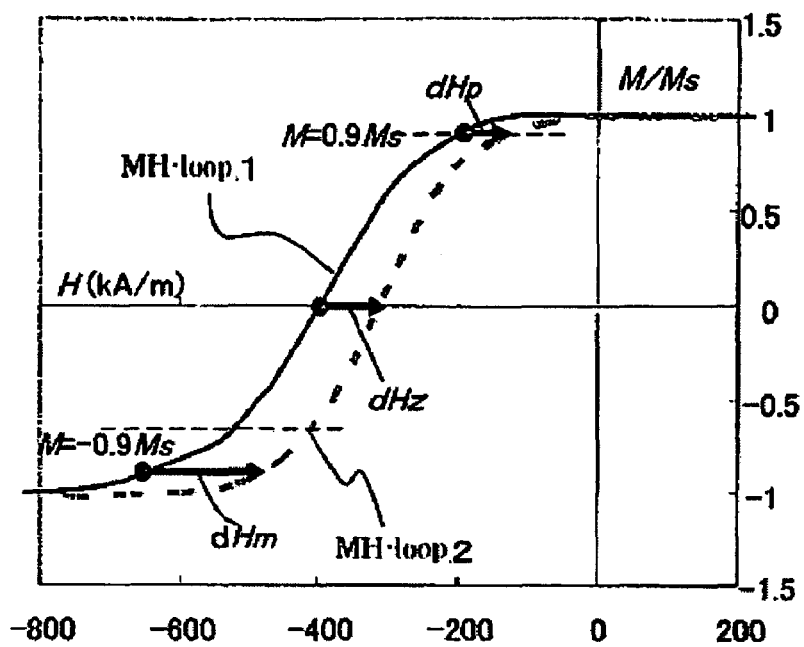
FIG. 13 shows the comparison of an MH-loop with different sweep rates of magnetic field.

After the magnetization is sufficiently saturated (saturation magnetization) by applying a positive large magnetic field exceeding 1 Tesla perpendicular to the medium, the magnetic field is swept down at a predetermined rate (R1: for instance, 50000 (A/m)/s), and the magnetization measurement is continuously carried out until it reaches a negative large magnetic field (magnetization curve 1). Moreover, a similar magnetization measurement (magnetization curve 2) is carried out with different sweep rates of magnetic field (R2: for instance, 5000 (A/m)/s), thereby, FIG. 13 is obtained.

Next, when the differences of magnetic field, which give the three types of different magnetization levels of 0.9×Ms, 0, and −0.9×Ms in the magnetization curves 1 and 2, are dHp, dHz, and dHm, using the normalized magnetic field h obtained by the following expression:

$$h = dHz \times (dHm - dHp)/(4 \times dHp \times dHm)$$

the intergrain boundary exchange coupling energy J is calculated by the following expression:

$$J = (h \times Ku + Ms^2 \times 10^7/(8\pi)) \times (Vz/(\pi \times t))^{0.5}.$$

Here, Ku is the anisotropy energy, and one obtained by a magnetic torque measurement may be used. t is the film thickness, and one obtained by a cross-sectional TEM image may be used.

Moreover, the activation volume Vz is obtained using dHz as follows, $$Vz = k \times T \times ln(R1/R2)/(Ms \times dHz)$$

Here, k is Boltzmann's constant, and T is the absolute temperature.

Figure 14:
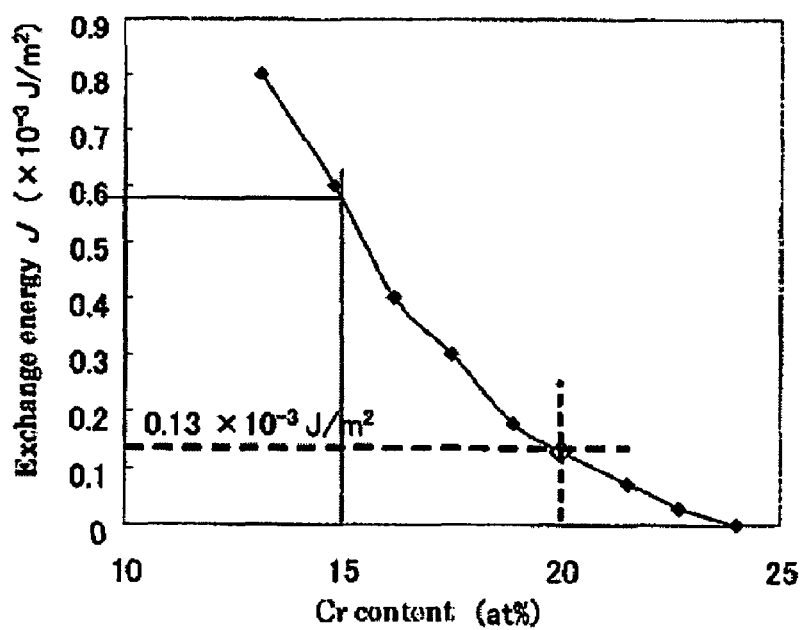
FIG. 14 shows the relationship between the intergrain boundary exchange coupling energy J and the magnetic grain boundary Cr-content.

FIG. 14 shows the intergrain boundary exchange coupling energy J of the CoCrPt alloy thin film at 25° C. calculated using this expression plotted against the grain boundary Cr content. J decreases with increasing grain boundary Cr content and becomes less than $0.13 \times 10^{-3}$ J/m² when the Cr content is greater than 20 at %. An Auger electronic spectrum, which uses the electron beam with an acceleration voltage of 3 kV and a beam diameter of 0.5 nm, is used for measurement of the grain boundary Cr content.

From FIG. 14, it is understood that the medium of the present embodiment fabricated with a substrate temperature of 150° C. while depositing the magnetic recording layer has a Cr content of 19 at % and an exchange coupling energy of $0.2 \times 10^{-3}$ J/m². Moreover, from FIG. 14, the conventional medium fabricated with a substrate temperature of 280° C. has a Cr content of 35 at % and an exchange coupling energy of 0.

Furthermore, the time dependence of residual magnetization was measured for the medium of the present embodiment fabricated with a substrate temperature of 150° C. and the conventional medium fabricated with a substrate temperature of 280° C. As a result, the deterioration of the output signal in the medium of the present embodiment could not be observed even if it was left for 100 hours at room temperature. On the other hand, the magnetization of the conventional medium decreased to 80% in 100 hours after recording.

Therefore, a thermally assisted magnetic recording system with low noise and excellent thermal stability can be provided by applying a medium to the thermally assisted magnetic recording system, having characteristics such that the intergrain magnetic exchange coupling is strong at room temperature and disappears at a recording temperature (a small amount of remaining magnetic exchange coupling is better than its disappearing completely).

Figure 15:
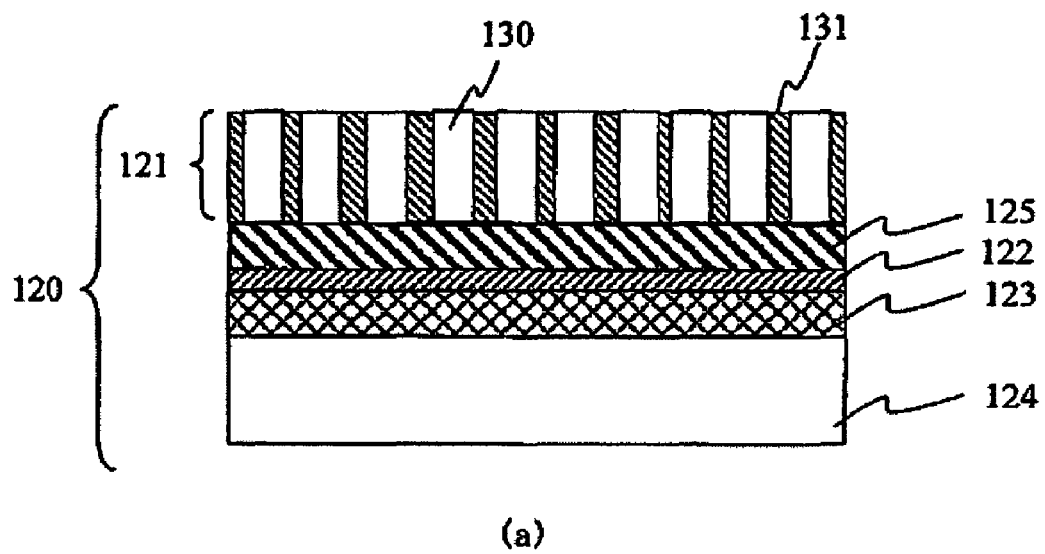
FIG. 15 shows a schematic drawing of a magnetic recording medium in the second embodiment of the present invention.
Figure 15:
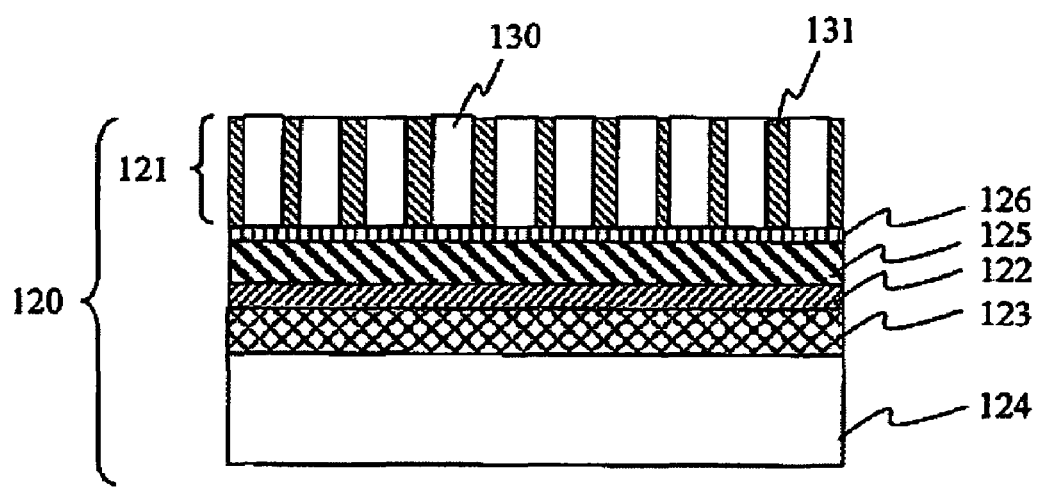

Next, the second embodiment of the present invention will be described. The structures of the heating mechanism, read head, and write head in the second embodiment are the same as those in FIGS. 3 and 4. FIGS. 15A and 15B are schematic drawings of the media used in the second embodiment.

The magnetic recording medium 120 shown in FIG. 15A is formed as follows; after sputter-depositing a 200 nm thick soft magnetic under layer 123 and a 15 nm thick first non-magnetic intermediate layer 122, in order, on the crystallized glass substrate 124, a layer consisting of five layers of an amorphous layer such as TbFeCo etc, or a CoCr layer or Co (0.3 nm) and Pd (0.7 nm) is deposited to a thickness of about 5 nm or less as the second intermediate layer 125 and, on top of them is formed a 20 nm thick CoCr alloy magnetic recording layer 121 such as, for instance, CoCrPt and CoCrPtB, etc. as the magnetic recording layer.

Here, the substrate temperature while sputtering the CoCr alloy magnetic recording layer 121 is between about 250° C. and 300° C., which is conventionally used.

FIG. 5 indicates that the Cr content of magnetic grain boundaries of the medium is about 30 at % or more and about 40 at % or less at substrate temperatures from about 250° C. to 320° C.

FIG. 14 shows that the magnetic exchange coupling between the magnetic grains becomes 0 when the Cr content is about 30 at % or more. In this embodiment of the present invention, it is preferable that the Curie point of the second intermediate layer agrees with the recording temperature or is slightly higher than the recording temperature while recording.

The magnetic exchange coupling between the magnetic moment of the second intermediate layer of the present embodiment is strong at room temperature. Therefore, magnetic characteristics are as well as the first embodiment, which has a large intergrain magnetic exchange coupling by magnetically coupling the second intermediate layer with the recording layer. That is, the parameter A value becomes much greater. Therefore, the medium of the present embodiment becomes thermally stable at room temperature. While recording, the magnetic exchange coupling between the magnetic moments of the second intermediate layer disappears by heating the medium. Therefore, excellent read/write characteristics with low noise can be obtained for the medium of the present embodiment as well as a medium which has a small intergrain magnetic exchange coupling. Here, when the magnetic exchange coupling between the magnetic moments of the second intermediate layer works a little rather than disappears completely, the magnetization transition slope becomes steeper and the noise can be made smaller. Therefore, the Curie point of TbFeCo may be preferably slightly higher than the temperature while recording.

Figure 16:
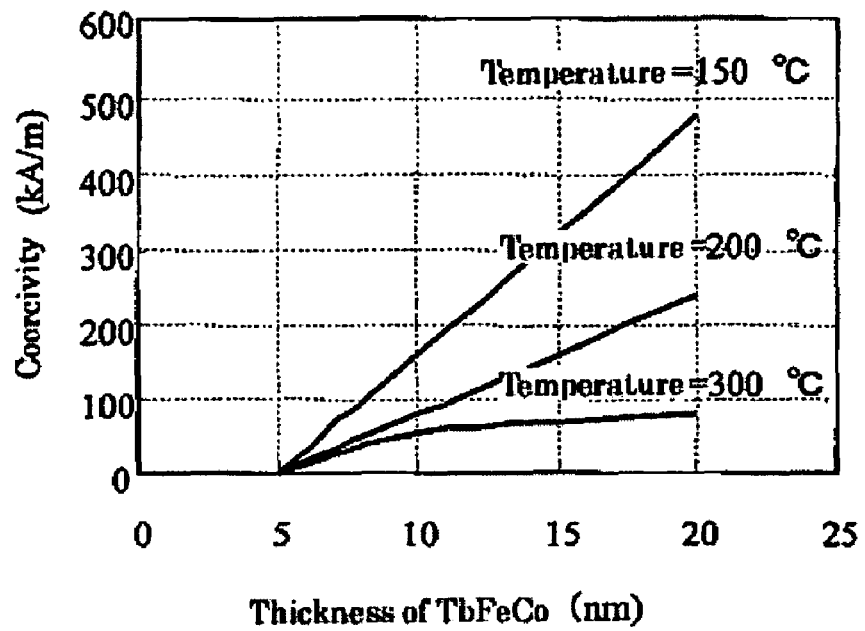
FIG. 16 shows the relationship between the coercivity and the film thickness when changing the heating temperature of the TbFeCo layer.

Next, thinking now about the film thickness of TbFeCo, the magnetic field intensity of the write head used in this thermally assisted recording system is about 960 kA/m at the center of the recording layer. In order to obtain excellent read/write characteristics, the anisotropy field should be reduced to the value which is the same as the magnetic head field intensity at the center of the recording layer. Therefore, FIG. 9 indicates that the heating temperature of the medium is controlled to be about 150° C. or more. That is, a film thickness has to be enough so that the magnetic exchange coupling between the magnetic moments of the second intermediate layer is lost when the heating temperature is controlled to be about 150° C. or higher. Because the magnetic exchange coupling is proportional to the coercivity, the film thickness dependence of the coercivity while heating the TbFeCo layer was measured. The results are shown in FIG. 16. The film thickness, at which the magnetic exchange coupling is 0 at a heating temperature of 150° C. or higher, is the one in which the coercivity becomes 0. FIG. 16 indicates that the film thickness of the second intermediate layer 125 is preferably about 5 nm or less. However, in order to obtain the coercivity at room temperature, a film thickness of at least about 1 nm or more is required.

Figure 17:
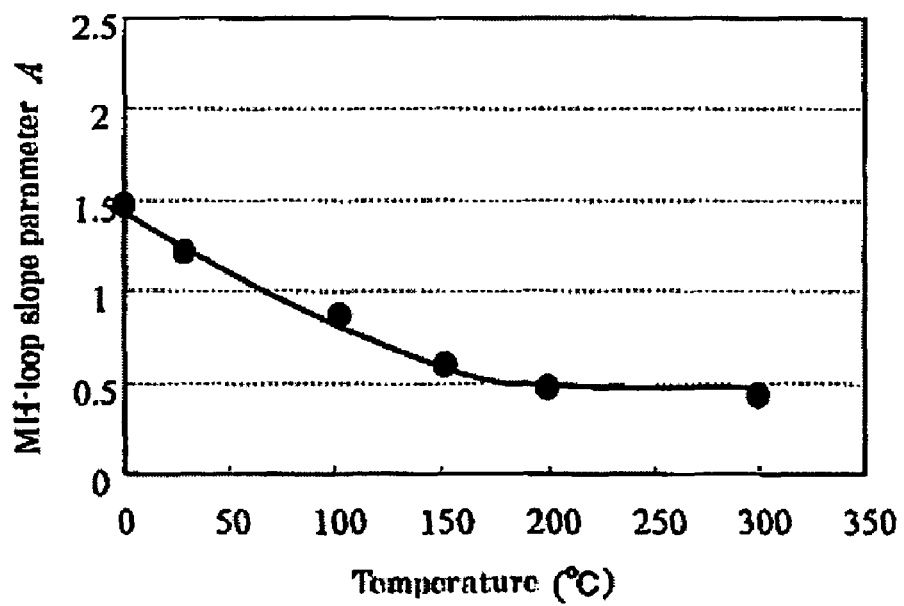
FIG. 17 shows the relationship between the MH-loop slope parameter A and the temperature in the second embodiment of the present invention.

From the results of measuring MH-loops of the present embodiment media using a Kerr effect measurement system, it was confirmed that the parameter A becomes 1.5. Next, MH-loops were measured with heating the medium. The heating temperature was changed from 0° C. to about 300° C. FIG. 17 shows the relationship between the parameter A and the heating temperature. FIG. 17 indicates that the parameter A decreases with increasing temperature. That is, it is understood that the magnetic exchange coupling between the magnetic grains decreased with increasing temperature became almost 0 above 200° C.

Figure 18:
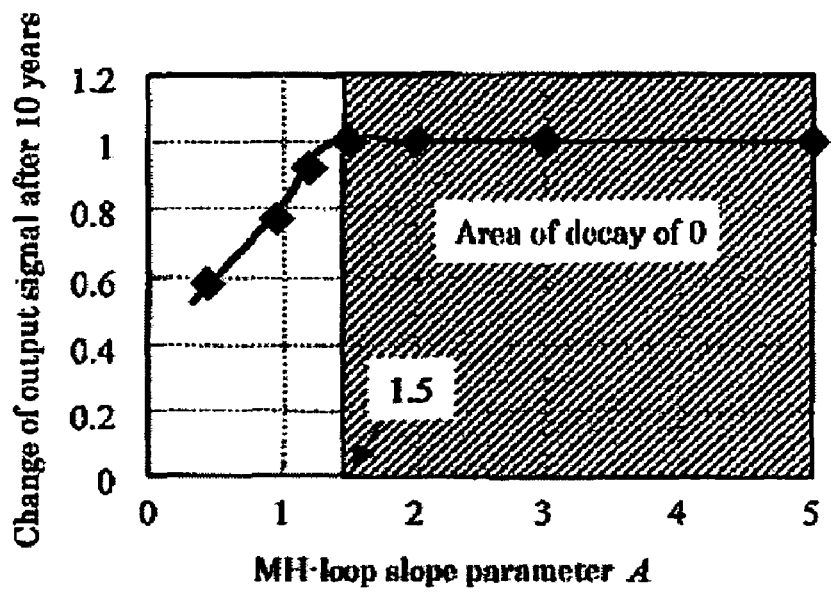
FIG. 18 shows the relationship between the change in output signal in 10 years after recording and the parameter A in the second embodiment of the present invention.

FIG. 18 is a simulation result of the relationship between the parameter A and change in output signal in 10 years after recording when the mechanism described in FIG. 4 is used and the medium of the present embodiment is heated up to about 200° C. for recording. The recording layer was assumed to have a grain size=3 nm, a recording film thickness=20 nm (Dgrain/t, which is the ratio of grain size Dgrain and film thickness t, is about 0.15), and $H_k$=1600 kA/m. The second intermediate layer was assumed to be a layer with a film thickness of 5 nm, a saturation magnetization $M_s$=0.25 T, and Ku=4×10$^5$ J/m3 and it was placed underneath the recording layer. Moreover, $M_s$ decreases with increasing temperature and the compensation temperature is 80° C. The recording magnetization pattern was alternately recorded upward and downward along the medium thickness direction with a magnetization transition length of 50 nm. Hereby, it is clear that the residual ratio of output signal increases with increasing parameter A and the signal does not decay when the parameter A is 1.5 or more. That is, it is understood that a medium with an A value of 1.5 or more has excellent thermal stability. It is understood that the signal did not decay when the parameter A was 1.5 or more as well as the result in FIG. 1, even when the same calculation was carried out with changing the Dgrain/t from 0.15 to 1.0

Figure 19:
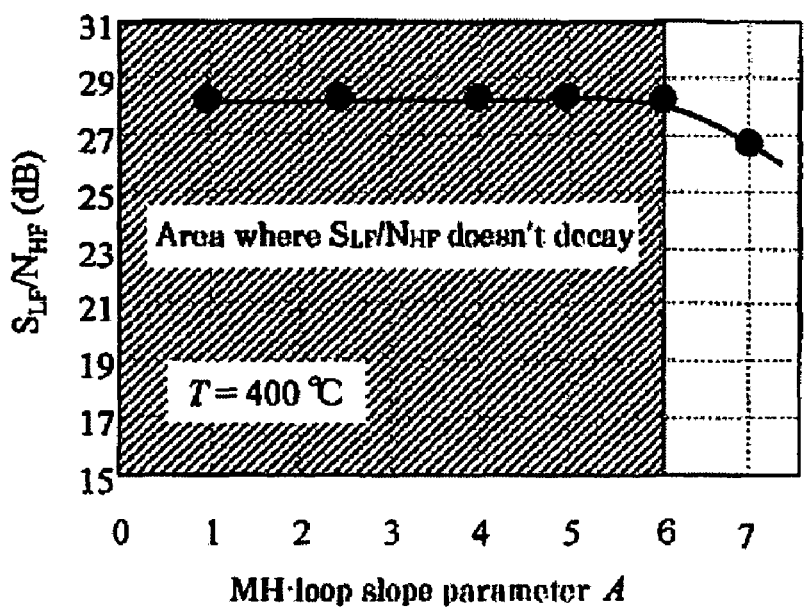
FIG. 19 shows the parameter A dependence of the SLF/NHF when recording is carried out with a heater temperature of 400□C in the second embodiment of the present invention.

FIG. 19 shows the A value dependence of $S_{LF}/N_{HF}$ while recording when the medium is heated up to about 400° C. It is understood that $S_{LF}/N_{HF}$ does not deteriorate if the parameter A is 6 or less.

There is a medium disclosed in JP-A No. 344725/2001, in which the recording layer and TbFeCo layer are directly sputter-deposited. Because the TbFeCo layer is used for the recording layer, a thickness of 10 nm or more is required, so that it is clear that the anisotropy energy of the TbFeCo layer is higher than that of a CoCr alloy. Therefore, the TbFeCo layer should be sputter-deposited on the recording layer to be closer to the write head than the recording layer. This is because a large recording magnetic field is required to record in TbFeCo layer. Because the TbFeCo layer does not have the function of a recording layer in the present embodiment, the film thickness can be made as thin as 5 run or less and the anisotropy energy also can be made small, which are differences from the above-mentioned well-known media.

Moreover, regarding the thermally assisted magnetic recording system, there is a medium disclosed in JP-A No. 358616/2002, in which a recording layer was directly sputter-deposited on TbFeCo layer. However, in this case, the different point from the present invention is that the Curie point is lower than the temperature while recording. Moreover, as mentioned above, the TbFeCo layer does not have a function as a recording layer in the present invention, but the TbFeCo layer of the medium disclosed in this patent application works as a recording layer at room temperature. Therefore, when conventional medium conditions (grain size of 3.0 nm, recording layer film thickness of 20 nm, and anisotropy energy of $5\times10^5$ J/m$^3$) are applied to this invention, a TbFeCo film thickness is required 50 nm or more, for achieving a $K_uV/kT=60$ or more. However, the TbFeCo film thickness of the present embodiment is 5 nm or less, which is different from the well-know example.

As another embodiment, FIG. 15B is a medium in which, after deposition up to the TbFeCo layer 125 similar to the medium shown in FIG. 15A, a CoCr layer 126 about 2-3 nm thick is sputter-deposited between that layer and the magnetic recording layer 121. The reason why the thickness of the CoCr layer is controlled to be about 2-3 run is that if the thickness is 2 nm or less, crystalline lattice mismatch occurs. On the other hand, if the thickness is greater than about 3 nm, the CrCo layer has the effect of improving the crystalline magnetic anisotropy of the magnetic recording layer 121.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A thermally assisted recording system comprising a magnetic recording medium, a magnetic pole applying a magnetic field H to said magnetic recording medium, and a heating mechanism to heat a magnetic field applied region of said magnetic recording medium while recording, wherein
    said magnetic recording medium includes a substrate and a recording layer formed on a substrate,
    said recording layer includes a ferromagnetic layer,
    a magnetic exchange coupling energy between magnetic grains comprising said ferromagnetic layer is controlled to be large at room temperature to let the magnetization of said magnetic grains be thermally stable, and is reduced drastically to make the magnetization transition slope steep while recording, and
    in an MH-loop providing a relationship between the magnetization M of said ferromagnetic layer and the magnetic field H, a parameter A which is obtained by normalizing said MH-loop slope parameter around the coercivity of the magnetic field applied region of said magnetic recording medium becomes nearly 1 by heating using the said heating mechanism while recording, wherein $$\left\{ A \equiv \frac{1}{\mu_0} \frac{\partial M}{\partial H} \bigg|_{M=0} \right\}$$

and $\mu_0$ is the absolute permeability of vacuum.

2. A thermally assisted recording system as in claim 1, wherein
    the parameter A, which is obtained by normalizing said MH-loop slope parameter around the coercivity, is greater than about 1.5 and less than about 6 at room temperature.

3. A thermally assisted recording system as in claim 1, wherein
    said recording layer comprises a CoCr system layer consisting of said magnetic grains and grain boundaries and the Cr content is about 15-20 at %.

4. A thermally assisted recording system as in claim 1, wherein said heating mechanism comprises a resistive heater disposed adjacent the magnetic pole.

5. A thermally assisted recording system as in claim 1, wherein the magnetic exchange coupling energy between said magnetic grains is $0.13\times10^{-3}$ J/m$^2$ or greater at room temperature.

6. A thermally assisted recording system comprising a magnetic recording medium, a magnetic pole applying a magnetic field to said magnetic recording medium, and a heating mechanism to heat a magnetic field applied region of said magnetic recording medium while recording, wherein
    said magnetic recording medium includes a substrate and a recording layer formed on a substrate,
    said recording layer includes a ferromagnetic layer,
    a magnetic exchange coupling energy between magnetic grains comprising said ferromagnetic layer is controlled to be large at room temperature to let the magnetization of said magnetic grains be thermally stable, and is reduced drastically to make the magnetization transition slope steep while recording,
    wherein the magnetic exchange coupling energy between said magnetic grains is $0.13\times10^{-3}$ J/m$^2$ or greater at room temperature.

7. A thermally assisted recording system as in claim 6 wherein said recording layer is a CoCr system alloy layer consisting of magnetic grains and grain boundaries, in which the Cr content of said grain boundaries is about 30-40 at %, and wherein said magnetic recording medium further includes:
    an intermediate layer between the substrate and the recording layer, the intermediate layer comprising
    five layers of an amorphous TbFeCo layer, a lamination layer of CoCr, or a lamination layer of Co and Pd, with a film thickness of about 5 nm or less.

8. A thermally assisted recording system as in claim 7, wherein said magnetic recording medium further includes:
    a soft magnetic layer and a nonmagnetic layer between the substrate and the intermediate layer.

9. A thermally assisted recording system as in claim 7, wherein said magnetic recording medium further includes:
    a CoCr layer 126 about 2-3 nm between the intermediate layer and the recording layer.

10. A thermally assisted recording system as in claim 6 wherein said magnetic recording medium is a perpendicular magnetic recording medium.

11. A thermally assisted recording system as in claim 6 wherein said recording layer comprises a CoCr system layer consisting of said magnetic grains and grain boundaries and the Cr content at said grain boundaries is about 15-20 at %.

12. A thermally assisted recording system comprising a magnetic recording medium, a magnetic pole applying a magnetic field to said magnetic recording medium, and a heating mechanism to heat a magnetic field applied region of said magnetic recording medium while recording, wherein
    said magnetic recording medium includes a substrate and a recording layer formed on a substrate,
    said recording layer includes a CoCr system alloy layer consisting of magnetic grains and grain boundaries, in which a Cr content of said grain boundaries is about 15-20 at %, wherein the Cr content of the magnetic grains is less than the Cr content of said grain boundaries;
    and, in an MH-loop providing a relationship between the magnetization M of said recording layer and the magnetic field H, a parameter A which is obtained by normalizing said MH-loop slope parameter around the coercivity, mentioned is greater than about 1.5 and less than about 6 at room temperature wherein $$\left\langle A \equiv \frac{1}{\mu_0} \frac{\partial M}{\partial H} \right|_{M=0}$$

and $\mu_0$ is the absolute permeability of vacuum.

13. A thermally assisted recording system as in claim 12, wherein the parameter A of the magnetic field applied region of said magnetic recording medium becomes nearly 1 by heating using the said heating mechanism while recording.

14. A thermally assisted recording system as in claim 12, wherein the magnetic exchange coupling energy between said magnetic grains is $0.13 \times 10^{-3}$ J/m² or greater at room temperature.

15. thermally assisted recording system as in claim 12, wherein said heating mechanism comprises a heater disposed adjacent the magnetic pole.

16. A thermally assisted recording system as in claim 12 wherein the substrate temperature while sputtering the recording layer is controlled to be from about 50° C. to 150° C.

17. A thermally assisted recording system as in claim 1 wherein said recording layer is a CoCr system alloy layer consisting of magnetic grains and grain boundaries, in which the Cr content of said grain boundaries is about 30-40 at %, and wherein said magnetic recording medium further includes:

an intermediate layer between the substrate and the recording layer, the intermediate layer comprising an amorphous TbFeCo layer, a lamination layer of CoCr and Pt, or a lamination layer of CoCr and Pd, with a film thickness of about 5 nm or less.

18. A thermally assisted recording system as in claim 17, wherein said magnetic recording medium further includes:

a soft magnetic layer and a nonmagnetic layer between the substrate and the intermediate layer; and a CoCr layer about 2-3 nm between the intermediate layer and the recording layer.

19. A thermally assisted recording system as in claim 17 herein the substrate temperature while sputtering the recording layer is controlled to be from about 250° C. to 300° C.

* * * * *

UNITED STATES PATENT AND TRADEMARK OFFICE
CERTIFICATE OF CORRECTION

PATENT NO. : 7,446,969 B2
APPLICATION NO. : 11/134088
DATED : November 4, 2008
INVENTOR(S) : Akagi et al.

Page 1 of 1

It is certified that error appears in the above-identified patent and that said Letters Patent is hereby corrected as shown below:

Claim 1, column 13, line 44:
"a parameter A which is obtained" change to
-- a parameter A, which is obtained --

Claim 12, column 14, line 66:
"a parameter A which is obtained" change to
-- a parameter A, which is obtained --

Claim 12, column 15, line 1:
"coercivity, mentioned is greater than about 1.5" change to
-- coercivity, is greater than about 1.5 --

Signed and Sealed this

Tenth Day of February, 2009

JOHN DOLL
*Acting Director of the United States Patent and Trademark Office*